(12) United States Patent
Lee

(10) Patent No.: US 10,316,474 B2
(45) Date of Patent: Jun. 11, 2019

(54) ELASTIC INFILL FOR ARTIFICIAL TURF

(71) Applicant: Fine Chemical Co., Ltd., Gimhae-si (KR)

(72) Inventor: Sung Yull Lee, Busan (KR)

(73) Assignee: FINE CHEMICAL CO., LTD., Gimhae (KR)

( * ) Notice: Subject to any disclaimer, the term of this patent is extended or adjusted under 35 U.S.C. 154(b) by 97 days.

(21) Appl. No.: 15/312,743

(22) PCT Filed: Mar. 6, 2015

(86) PCT No.: PCT/KR2015/002183
§ 371 (c)(1),
(2) Date: Nov. 21, 2016

(87) PCT Pub. No.: WO2015/194740
PCT Pub. Date: Dec. 23, 2015

(65) Prior Publication Data
US 2017/0183830 A1    Jun. 29, 2017

(30) Foreign Application Priority Data

Jun. 20, 2014  (KR) .................. 10-2014-0075905

(51) Int. Cl.
| | |
|---|---|
| *E01C 13/08* | (2006.01) |
| *C08L 15/00* | (2006.01) |
| *C08L 23/16* | (2006.01) |
| *C08F 255/02* | (2006.01) |
| *C08K 3/00* | (2018.01) |
| *C08K 5/54* | (2006.01) |
| *C08L 23/00* | (2006.01) |
| *C08F 287/00* | (2006.01) |

(52) U.S. Cl.
CPC ............ *E01C 13/08* (2013.01); *C08F 255/02* (2013.01); *C08F 255/026* (2013.01); *C08F 287/00* (2013.01); *C08K 3/00* (2013.01); *C08K 5/54* (2013.01); *C08L 15/00* (2013.01); *C08L 23/00* (2013.01); *C08L 23/16* (2013.01); *C08L 2312/08* (2013.01)

(58) Field of Classification Search
CPC .......... E01C 13/08; C08L 15/00; C08L 23/16
See application file for complete search history.

(56) References Cited

U.S. PATENT DOCUMENTS

| | | | |
|---|---|---|---|
| 2003/0054311 A1* | 3/2003 | Kanakkanatt | C10L 7/02 431/288 |
| 2006/0100342 A1* | 5/2006 | Jensen | C08K 9/08 524/492 |
| 2008/0182040 A1* | 7/2008 | Chereau | C08J 3/212 428/17 |
| 2014/0193593 A1* | 7/2014 | Daluise | E01C 13/08 428/17 |

FOREIGN PATENT DOCUMENTS

| | | |
|---|---|---|
| JP | H08127954 A | 5/1996 |
| JP | 20120102491 | 5/2012 |
| KR | 1020070078063 | 1/2008 |
| KR | 1020090087206 | 8/2009 |
| KR | 1020090091346 | 8/2009 |
| KR | 1020090125025 | 12/2009 |
| KR | 1020130148553 | 4/2014 |
| KR | 1020140063960 | 5/2014 |

OTHER PUBLICATIONS

International Search Report of PCT/KR2015/002183, dated Jun. 11, 2015 (English Translation).

* cited by examiner

*Primary Examiner* — Catherine S Branch
(74) *Attorney, Agent, or Firm* — STIP Law Group, LLC

(57) ABSTRACT

Provided is an elastic infill for artificial turf. The elastic infill is produced by pelletization of an elastomer composition comprising a silane coupling agent and a mixture of an olefin copolymer-containing base resin and an inorganic filler. The silane coupling agent is present in admixture with the mixture. Alternatively, the silane coupling agent may be grafted onto the olefin copolymer to allow cross-linking of the olefin copolymer in the presence of water.

13 Claims, No Drawings

ELASTIC INFILL FOR ARTIFICIAL TURF

CROSS-REFERENCE TO RELATED APPLICATIONS

This application is the U.S. National Phase under 35 U.S.C. § 371 of International Application No. PCT/KR2015/002183 filed on Mar. 6, 2015, which in turn claims the benefit of Korean Application No. KR 10-2014-0075905, filed on Jun. 20, 2014, the disclosures of which are incorporated by reference into the present application.

TECHNICAL FIELD

The present disclosure relates to an elastic infill for artificial turf, and more specifically to a highly heat resistant elastic infill for artificial turf.

BACKGROUND ART

Artificial turf feels like natural grass, can be used for a prolonged period of time, requires low maintenance cost, and is cushiony enough to prevent injury. Due to these advantages, artificial turf has been increasingly installed on sports fields across the world. Most of the currently used artificial turf products are of a carpet type and have a structure in which rubber chips and sand are filled to impart a texture similar to that of natural grass. However, the use of waste tire rubber chips as artificial turf infills has become a social issue because of their hazards to human health and environment. Due to their black color, waste tire rubber chips tend to absorb sunlight and increase the temperature of playgrounds, resulting in deterioration of the exercise environment. At temperatures exceeding 30° C. in summer, rubber chips produce an acrid smell and are often melted on the hot ground and stuck to the bottoms of players' shoes. Since waste tire chips are produced by pulverization, they become brittle after long-term use and produce dust, which is a cause of environmental pollution. The detection of harmful substances, including heavy metals, polynuclear aromatic hydrocarbons, toluene, benzene, and nitrosamines, in artificial turf products was reported in some European countries. Under these circumstances, there is a growing need for new artificial turf infills that have the potential to replace waste tire chips.

DETAILED DESCRIPTION OF THE INVENTION

According to one aspect of the present invention, there is provided an elastic infill for artificial turf that is produced by pelletization of an elastomer composition comprising a silane coupling agent and a mixture of an olefin copolymer-containing base resin and an inorganic filler wherein the silane coupling agent is present in admixture with the mixture or is grafted onto the olefin copolymer to allow cross-linking of the olefin copolymer in the presence of water.

According to a further aspect of the present invention, there is provided a method for producing an elastic infill for artificial turf, including: providing an elastomer composition including a silane coupling agent and a mixture of an olefin copolymer-containing base resin and an inorganic filler; kneading the elastomer composition; and extruding and pelletizing the kneaded elastomer composition.

MODE FOR CARRYING OUT THE INVENTION

Rubber chips produced by cross-linking EPDM rubbers are currently used instead of harmful waste tire chips. The production of the rubber chips requires pulverization of the cross-linked rubbers. However, the chips produce dust that tends to scatter after construction. Further, the surface morphology of the rubber chips is irregular, leaving unnecessary spaces therebetween. The spaces disperse the cohesion between the rubber chips, making it impossible for the rubber chips to properly support turf.

Korean Patent No. 10-0799262 describes an environmentally friendly infill composition for artificial turf which includes a styrene-ethylene• butadiene-styrene (SEBS) resin, an olefinic elastomer, a mineral oil, an inorganic filler, a weathering stabilizer, and an inorganic pigment. This patent introduces the production of pellet-shaped chips by extrusion rather than by pulverization. Advantageously, the chips produce no dust after construction. However, the infill composition is not suitable for use in an artificial turf infill from an economic viewpoint because the SEBS resin is at least twice more expensive than general rubbers and polyolefin elastomers. Accordingly, the use of the expensive SEBS resin limits the marketability of the infill composition. An olefinic elastomer may be used in admixture with the SEBS resin. This contributes to a reduction in material cost but causes poor heat resistance and reduced elastic recovery of an infill of the infill composition due to the low melting point of the olefinic elastomer. As a result, there is a risk that artificial turf using the infill will undergo deformation and the pellets will agglomerate over a long period of time after construction. Thus, there is a need for an improved elastic infill for artificial turf.

A detailed description will be given of the present disclosure.

According to one embodiment, the elastic infill for artificial turf is produced by pelletizing an elastomer composition comprising a silane coupling agent and a mixture of an olefin copolymer-containing base resin and an inorganic filler. In this embodiment, the silane coupling agent is present in admixture with the mixture or is grafted onto the olefin copolymer to allow cross-linking of the olefin copolymer in the presence of water.

In one embodiment, the olefin copolymer may be an ethylene copolymer. The ethylene copolymer may be a copolymer of i) ethylene and ii) at least one ethylenically unsaturated monomer selected from the group consisting of $C_3$-$C_{10}$ α-monoolefins, $C_1$-$C_{12}$ alkyl esters of $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinyl esters of saturated $C_2$-$C_{18}$ carboxylic acids.

The ethylene copolymer may be a soft polymer having a Shore A hardness between 40 and 95. The ethylene copolymer is the most suitable polymer that meets the requirements of the elastic infill in terms of oxidation resistance, weather resistance, elasticity, and price.

Specific examples of ethylene• copolymers suitable for use in the elastic infill include ethylene vinyl acetate (EVA), ethylene butyl acrylate (BA), ethylene methyl acrylate (EMA), ethylene ethyl acrylate (EEA), ethylene methyl methacrylate (EMMA), ethylene butene copolymers (EB-Co), and ethylene octene copolymers (EO-Co).

In one embodiment, the olefin copolymer may be an olefin/α-olefin (OAO) copolymer. The term "olefin/α-olefin copolymer" used herein generally refers to a copolymer including ethylene or propylene and an α-olefin having two or more carbon atoms. The α-olefin is an olefin consisting of at least two carbon atoms and having a terminal carbon-carbon double bond.

Preferably, ethylene or propylene makes up the largest mole fraction of the polymer. Specifically, ethylene or propylene accounts for about 50 mole % or more of the polymer. More preferably, ethylene or propylene accounts for about 60 mole % or more, about 70 mole % or more or about 80 mole % or more of the polymer. The substantial remainder of the polymer includes one or more other comonomers. The comonomers are preferably α-olefins having three or more carbon atoms. The olefin/α-olefin copolymer may be an ethylene/octene copolymer. In this case, the polymer includes about 80 mole % or more of ethylene and about 10 to about 20 mole %, preferably about 15 to about 20 mole % of octene.

The olefin/α-olefin copolymer may be a random or block copolymer. Representative examples of OAO copolymers include ethylene alpha olefin (EAO) copolymers and propylene alpha olefin (PAO) copolymers. Many products are commercially available for the olefin/α-olefin copolymer. Suitable EAO copolymers include ENGAGE and INFUSE from Dow Chemical, TAFMER from Mitsui, EXACT from Exxon Mobile, and LG-POE from LG Chem. Suitable PAO copolymers include VERSIFY from Dow Chemical, NOTIO from Mitsui, and VISTAMAXX from Exxon Mobile.

In one embodiment, the olefin/α-olefin copolymer used in the artificial turf infill is an olefin block copolymer (OBC). The olefin block copolymer (OBC) is a multi-block copolymer. The multi-block copolymer refers to a polymer including two or more chemically distinct zones or segments (also called "blocks") that are preferably bonded in a linear configuration, i.e. a polymer including chemically distinguished units that are bonded end-to-end to polymerized ethylenic or propylenic functional groups rather than in a pendant or graft configuration.

The olefin block copolymer (OBC) refers to an ethylene/α-olefin multi-block copolymer or a propylene/α-olefin multi-block copolymer. The olefin block copolymer includes ethylene or propylene and one or more copolymerizable α-olefin comonomers in a polymerized form. The olefin block copolymer is characterized by the presence of a plurality of blocks or segments of two or more polymerized monomer units having different chemical or physical properties.

In some embodiments, the multi-block copolymer may be represented by the following formula:

(AB)n wherein n is an integer of at least 1, preferably an integer greater than 1, for example, 2, 3, 4, 5, 10, 15, 20, 30, 40, 50, 60, 70, 80, 90, 100 or higher, A represents a hard block or segment, and B represents a soft block or segment. Preferably, A and B are linked in a linear configuration rather than in a branched or star configuration. The hard segment refers to a block of polymerized units in which ethylene or propylene is present in a particular amount. In some embodiments, the ethylene or propylene content of the hard segment is 95% by weight or more. In further embodiments, the ethylene or propylene content of the hard segment is 98% by weight or more. That is, in some embodiments, the content of the comonomers in the hard segment is not greater than 5% by weight. In further embodiments, the content of the comonomers in the hard segment is not greater than 2% by weight. In some embodiments, the hard segment is wholly or substantially composed of ethylene or propylene. Meanwhile, the soft segment refers to a block of polymerized units in which the comonomers are present in a particular amount. In some embodiments, the content of the comonomers in the soft segment is 5% by weight or more. In further embodiments, the content of the comonomers in the soft segment is 8% by weight or more, 10% by weight or more, or 15% by weight or more. In further embodiments, the content of the comonomers in the soft segment is 20% by weight or more, 25% by weight or more, 30% by weight or more, 35% by weight or more, 40% by weight or more, 45% by weight or more, 50% by weight or more, or 60% by weight or more.

In one embodiment, the olefin block copolymer may have a density of 0.85 g/cc to 0.91 g/cc or 0.86 g/cc to 0.88 g/cc.

In one embodiment, the olefin block copolymer may have a melt index (MI) of 0.01 g/10 minutes to 30 g/10 minutes, 0.01 g/10 minutes to 20 g/10 minutes, 0.1 g/10 minutes to 10 g/10 minutes, 0.1 g/10 minutes to 5.0 g/10 minutes, or 0.1 g/10 minutes to 1.0 g/10 minutes, as measured by ASTM D1238 (190° C., 2.16 kg).

In one embodiment, the olefin block copolymer produced in a continuous process may have a polydispersity index (PDI) of 1.7 to 3.5, 1.8 to 3, 1.8 to 2.5, or 1.8 to 2.2. The olefin block copolymer produced in a batch or semi-batch process may have a PDI of 1.0 to 3.5, 1.3 to 3, 1.4 to 2.5, or 1.4 to 2.

In one embodiment, the olefin block copolymer may contain 5 to 30% by weight, 10 to 25% by weight, or 11 to 20% by weight of the hard segment. The hard segment may contain 0.0 to 0.9% by mole of units derived from the comonomers. The olefin block copolymer may contain 70 to 95% by weight, 75 to 90% by weight, or 80 to 89% by weight of the soft segment. The soft segment may contain less than 15% by mole or 9 to 14.9% by mole of units derived from the comonomers. In one embodiment, the comonomer may be butene or octene.

The olefin block copolymer has a chain structure in which blocks of hard and soft segments are arranged alternately. Due to this chain structure, the olefin block copolymer has both stiffness of the hard segments and flexibility of the soft segments, which are responsible for its high heat resistance compared to that of ethylene random copolymers with similar hardness and its comparable elastic recovery to styrenic or vulcanized olefinic thermoplastic elastomers. In addition, the olefin block copolymer causes no dust and environmental problems and is advantageous in terms of price over styrenic elastomer mixtures.

The olefin/α-olefin copolymer used in the elastic infill is an olefin random copolymer (ORC), which is preferred because of its very low price.

The olefin random copolymer may be a random copolymer of ethylene or propylene and at least one copolymerizable α-olefin comonomer.

The ORC may be a copolymer of ethylene and an α-olefin, i.e. an EAO copolymer. In this case, the ORC may contain at least one copolymer of a $C_3$-$C_{20}$ α-olefin, a $C_3$-$C_{12}$ α-olefin or a $C_3$-$C_8$ α-olefin. A suitable α-olefin may be straight chained or branched (for example, substituted with at least one $C_1$-$C_3$ alkyl or aryl group). Specific examples of such α-olefins include propylene, butene, 3-methyl-1-butene, 3,3-dimethyl-1-butene, pentene, pentene substituted with at least one methyl, ethyl or propyl group, hexene substituted with at least one methyl, ethyl or propyl group, heptene substituted with at least one methyl, ethyl or propyl group, octene substituted with at least one methyl, ethyl or propyl group, nonene substituted with at least one methyl, ethyl or propyl group, decene substituted with at least one ethyl, methyl or dimethyl group, dodecene substituted with at least one ethyl, methyl or dimethyl group, and styrene substituted with at least one ethyl, methyl or dimethyl group. Particularly preferred α-olefin comonomers are propylene, butene (e.g., 1-butene), hexene, and octene (e.g., 1-octene or 2-octene). The ethylene content of the copolymer may be from 60 mole % to 99.5 mole %. In some embodiments, the ethylene content may be from 80 mole % to 99 mole %. In some embodiments, the ethylene content may be from 85 mole % to 98 mole %. Accordingly, the α-olefin content of the copolymer may be limited to the range of 0.5 mole % to 40 mole %. In some embodiments, the α-olefin content may be limited to the range of 1 mole % to 20 mole %. In some embodiments, the α-olefin content may be limited to the range of 2 mole % to 15 mole %. The distribution of the α-olefin comonomer is typically random and is uniform over different molecular weight fractions of the ethylene copolymer.

The ORC may be a copolymer of propylene and an α-olefin, i.e. a PAO copolymer. In this case, the ORC may contain at least one copolymer of a $C_2$-$C_{20}$ α-olefin, a $C_2$-$C_{12}$ α-olefin or a $C_2$-$C_8$ α-olefin. A suitable α-olefin may be straight chained or branched (for example, substituted with at least one $C_1$-$C_3$ alkyl or aryl group). Specific examples of such α-olefins include ethylene, butene, 3-methyl-1-butene, 3,3-dimethyl-1-butene, pentene, pentene substituted with at least one methyl, ethyl or propyl group, hexene substituted with at least one methyl, ethyl or propyl group, heptene substituted with at least one methyl, ethyl or propyl group, octene substituted with at least one methyl, ethyl or propyl group, nonene substituted with at least one methyl, ethyl or propyl group, decene substituted with at least one ethyl, methyl or dimethyl group, dodecene substituted with at least one ethyl, methyl or dimethyl group, and styrene substituted with at least one ethyl, methyl or dimethyl group. Particularly preferred α-olefin comonomers are ethylene, butene (e.g., 1-butene), hexene, and octene (e.g., 1-octene or 2-octene). The propylene content of the copolymer may be from 60 mole % to 99.5 mole %. In some embodiments, the propylene content may be from 80 mole % to 99 mole %. In some embodiments, the propylene content may be from 85 mole % to 98 mole %. Accordingly, the α-olefin content of the copolymer may be limited to the range of 0.5 mole % to 40 mole %. In some embodiments, the α-olefin content may be limited to the range of 1 mole % to 20 mole %. In some embodiments, the α-olefin content may be limited to the range of 2 mole % to 15 mole %. The distribution of the α-olefin comonomer is typically random and is uniform over different molecular weight fractions of the propylene copolymer.

The density of the ethylene/α-olefin (EAO) copolymer or the propylene/α-olefin (PAO) copolymer may be a function of the length and amount of the α-olefin. That is, as the chain length and amount of the α-olefin increases, the density of the copolymer decreases. Generally, the copolymer can better retain a three-dimensional structure at a higher density and can have better elastomeric properties at a lower density.

The ORC may have a density of 0.86 to 0.90 g/cc. In some embodiment, the ORC may have a density of 0.861 to 0.89 g/cc. In some embodiment, the ORC may have a density of 0.862 to 0.88 g/cc.

The silane coupling agent present in the elastomer composition is grafted onto the olefin copolymer in the presence of a radical initiator present in the composition and allows cross-linking of the olefin copolymer in the presence of water. Due to the presence of the silane coupling agent in the elastomer composition, the elastic infill produced by pelletization of the elastomer composition can be cross-linked when heated in water in a subsequent processing step. Alternatively, the elastic infill may be constructed in artificial turf without further processing after pelletization of the composition. In this case, the elastic infill can absorb moisture from air and be cross-linked in nature over time.

The silane coupling agent is chemically bound to the base resin to form a silane grafted copolymer and serves as functional groups for the cross-linking of the elastic infill after pelletization. The silane coupling agent may be an alkoxysilane compound. Examples of suitable alkoxysilane compounds include vinyltrimethoxysilane, vinyltriethoxysilane, tetraethoxysilane, tetra-n-propoxysilane, methyltriethoxysilane, methyltrimethoxysilane, methyltri(2-methoxyethoxy)silane, 3-methacryloyloxypropyltrimethoxysilane, 3-mercaptopropyltrimethoxysilane, 3-aminopropyltrimethoxysilane, and 3-glycidyloxypropyltrimethoxysilane. These silane coupling agents may be used alone or in combination of two or more thereof.

The degree of cross-linking of the elastic infill may be adjusted depending on the amount of the silane coupling agent in the elastomer composition.

In the elastic infill of the present invention, the content of the silane coupling agent is from 0.5 to 5 parts by weight, preferably from 0.8 to 3 parts by weight, more preferably from 1 to 2 parts by weight, based on 100 parts by weight of the base resin. If the silane coupling agent is present in an amount of less than the lower limit defined above, the elastic infill may not be effectively cross-linked, resulting in insufficient heat resistance. As a result, the elastic infill tends to agglomerate at high temperatures in summer. Meanwhile, if the silane coupling agent is present in an amount exceeding the upper limit defined above, the cross-linking density of the elastic infill does not increase above a predetermined level, which is economically undesirable.

The formation of the silane grafted copolymer requires the presence of a radical polymerization initiator in the elastomer composition. The radical polymerization initiator serves to induce chemical grafting the silane coupling agent onto the base resin. As the radical polymerization initiator, there may be used, for example, t-butyl cumyl peroxide, benzoyl peroxide, cumene hydroperoxide, dicumyl peroxide, t-butyl peroxybenzoate, t-butyl peroxyisopropyl carbonate, t-butyl peroxylaurylate, t-butyl peroxyacetate, di-t-butyl peroxyphthalate, t-dibutyl peroxymaleate, cyclohexanone peroxide, t-butylcumyl peroxide, t-butyl hydroperoxide, 1,3-bis(t-butylperoxyisopropyl)benzene, methyl ethyl ketone peroxide, 2,5-dimethyl-2,5-di(benzoyloxy)hexane, 2,5-dimethyl-2,5-di(t-butylperoxy)hexane, di-t-butyl peroxide, 2,5-dimethyl-2,5-(t-butylperoxy)-3-hexane, n-butyl-4,4-bis(t-butylperoxy)valerate, α,α'-bis(t-butylperoxy) diisopropylbenzene or a mixture thereof.

The elastomer composition may optionally further include a catalyst to shorten the time required for cross-linking of the elastic infill in the presence of water on the grafting step. Examples of suitable catalysts include dibutyltin dilaurate, dibutyltin dimaleate, dibutyltin diacetate, dioctyltin maleate, dibutyltin dioctoate, tetrabutyl titanate, hexylamine, dibutylamine acetate, tin octoate (tin (II) 2-ethylhexanoate), lead naphthenate, zinc caprylate, and cobalt naphthenate.

The catalyst may be present in an amount of 0.05 to 1 part by weight, preferably 0.1 to 0.7 part by weight, based on 100 parts by weight of the base resin. The presence of the catalyst in an amount of less than the lower limit defined above leads to slow cross-linking, and as a result, more energy and time is required for cross-linking. Meanwhile, the presence of the catalyst in an amount exceeding the upper limit defined above does not contribute to further improvement of cross-linking rate.

The inorganic filler serves to increase the specific gravity of the infill after construction in artificial turf so that the infill is prevented from being swept away even during heavy rainfall. The inorganic filler is added for the purpose of preventing the infill from being thermally deformed. Examples of such inorganic fillers include calcium carbonate ($CaCO_3$), talc, mica, clay, silica ($SiO_2$), barium sulfate ($BaSO_4$), and magnesium carbonate ($MgCO_3$). These inorganic fillers may be used alone or in combination. Calcium carbonate is most preferred because its low price. The inorganic filler may be used in an amount of 50 to 500 parts by weight, preferably 80 to 400 parts by weight, based on 100 parts by weight of the base resin. The use of the inorganic filler in an amount of less than 50 parts by weight leads to a low specific gravity of the elastic infill, increasing the risk that the elastic infill may be swept away by rain. Meanwhile, the use of the inorganic filler in an amount of more than 500 parts by weight may excessively increase the hardness of the elastic infill, cause loss of elasticity of the elastic infill, and excessively reduce the strength of the elastic infill, increasing the risk that the elastic infill may be readily broken, for example, when players slide on artificial turf during their play time.

The base resin used in the elastic infill of the present invention may further include a rubber selected from the group consisting of natural rubbers, synthetic rubbers, and combinations thereof. The rubber is added for the purpose of supporting the performance of the olefin copolymer or reducing the production cost of the elastic infill. The amount of the rubber is limited to a predetermined range.

The natural rubber may be a general natural rubber or a modified natural rubber. The general natural rubber may be one of those known in the art. No particular limitation is imposed on the specification (e.g., the country of origin) of the general natural rubber. The natural rubber includes cis-1,4-polyisoprene as a major component. Alternatively, the natural rubber may also include trans-1,4-polyisoprene depending on required characteristics. For example, the natural rubber may be balata, which is a latex obtained from trees of the Sapotaceae family indigenous to South America. Balata includes trans-1,4-polyisoprene as a major component. The modified natural rubber refers to a rubber produced by modifying or purifying the general natural rubber. As the modified natural rubber, there may be exemplified epoxidized natural rubber (ENR), deproteinized natural rubber (DPNR), or hydrogenated natural rubber.

The synthetic rubber may be selected from the group consisting of styrene butadiene rubber (SBR), modified styrene butadiene rubber, butadiene rubber (BR), modified butadiene rubber, chlorosulfonated polyethylene rubber, epichlorohydrin rubber, fluorine rubber, silicone rubber, nitrile rubber, hydrogenated nitrile rubber, nitrile butadiene rubber (NBR), modified nitrile butadiene rubber, chlorinated polyethylene rubber, styrene butadiene styrene (SBS) rubber, styrene ethylene butylene styrene (SEBS) rubber, styrene isoprene styrene (SIS) rubber, ethylene propylene rubber, ethylene propylene diene (EPDM) rubber, hypalon rubber, chloroprene rubber, ethylene vinyl acetate rubber, acrylic rubber, hydrin rubber, vinylbenzyl chloride styrene butadiene rubber, bromomethyl styrene butyl rubber, maleated styrene butadiene rubber, carboxylated styrene butadiene rubber, epoxy isoprene rubber, maleated ethylene propylene rubber, carboxylate nitrile butadiene rubber, brominated polyisobutyl isoprene-co-paramethyl styrene (BIMS) rubber, vulcanized olefinic thermoplastic elastomers, and combinations thereof.

The rubber is preferably a styrenic thermoplastic elastomer or a vulcanized olefinic elastomer. When the styrenic thermoplastic elastomer is mixed with the base resin, the elastic recovery of the elastic infill can be improved. The vulcanized olefinic elastomer can contribute to an improvement in the heat resistance of the elastic infill.

In some embodiments, the amounts of the ORC, the OBC, and the rubber in the base resin may be appropriately determined taking into consideration various factors, such as extrusion workability, heat resistance, and elastic recovery. For example, the amount of the rubber may be determined from the viewpoint of economic efficiency and performance. The rubber is preferably used in an amount of 5 to 50 parts by weight, based on 100 parts by weight of the olefin copolymer.

The elastomer composition may further include a processing aid. The processing aid may be polybutene or a process oil, which improves the processability of the mixed compound and prevents an increase in hardness when a large amount of the inorganic filler is added, achieving improved flexibility. The processing aid is added in an amount of 2 to 500 parts by weight, preferably 10 to 200 parts by weight, based on 100 parts by weight of the base resin. If the content of the processing aid is less than the lower limit defined above, flowability may be insufficient during processing. Meanwhile, if the content of the processing aid is more than the upper limit defined above, there may be a risk of bleeding.

The processing aid may be polybutene that is highly compatible with the olefinic resin. This compatibility prevents the migration of the low molecular weight polybutene or eliminates the risk of bleeding of the polybutene in water, making the use of the polybutene environmentally friendly. It is preferred that the polybutene has a molecular weight of 300 to 8,000. The process oil may be a mineral oil, such as a paraffinic or naphthenic oil.

The elastomer composition may further include a resin stabilizer for the purpose of preventing the physical properties and color of the elastomer from changing after construction in artificial turf. For example, the resin stabilizer may be a thermal stabilizer, an antioxidant or a UV stabilizer. The resin stabilizer may be used in an amount of 0.01 to 10 parts by weight, based on 100 parts by weight of the base resin. If the resin stabilizer is used in an amount of less than 0.01 parts by weight, its effect is substantially negligible. Meanwhile, it is not economically feasible to use the resin stabilizer in an amount of more than 10 parts by weight, considering its effectiveness.

The thermal stabilizer is based on tin, lead, cadmium or zinc, preferably based on less harmful zinc. The antioxidant may be an amine-, phenol- or phosphorus-based. The UV stabilizer may be benzophenone-, benzotriazole- or hindered amine-based.

The elastomer composition may further include a pigment. Black waste tire rubber chips strongly absorb sunlight, which is a cause of temperature rise. The use of the pigment allows the elastic infill to have a variety of colors. For example, the pigment may be of the same color (i.e. green) as artificial turf. Taking efficiency into consideration, it is preferable that the amount of the pigment is within a range, 0.1 to 4 parts by weight, based on 100 parts by weight of the base resin.

The elastic infill has a rebound resilience of at least 50%, usually 50 to 60%, as tested according to ASTM D2632. If the rebound resilience of the elastic infill is lower than 50%, the rebound of a football may be below the standard. Meanwhile, if the rebound resilience of the elastic infill exceeds 60%, large impacts may be applied to the soles of players' feet during their play, and hence, the players may be injured or tend to feel tired.

The elastic infill has a compression set of 2 to 20% or 5 to 15% at room temperature and 15 to 40% or 20 to 35% at 70° C., as measured based on ASTM D395. Due to its low compression set, the elastic infill can maintain its original shape for a long period of time and is prevented from agglomerating even at high temperatures in summer.

The cross-linking of the olefin copolymer can contribute to a marked improvement in the heat resistance of the elastic infill. Particularly, the use of the inexpensive olefin random copolymer as the base resin enables the production of the elastic infill with high quality in an economical manner despite its poor heat resistance. General artificial turf constructed on playgrounds is heated (reportedly to a maximum of 70° C.) in the middle of summer, resulting in softening or melting and agglomeration of infills. In severe cases, this agglomeration leads to caking. Such a problem can be solved by using the elastic infill of the present invention.

According to one embodiment, the elastic infill may be produced by extrusion and pelletization of the elastomer composition.

The elastic infill can be produced by the following method. First, an elastomer composition including a silane coupling agent and a mixture of an olefin copolymer-containing base resin and an inorganic filler is provided. The elastomer composition, the silane coupling agent, the inorganic filler, the base resin, and the olefin copolymer are the same as those described above. The elastomer composition may further include at least one additive selected from the group consisting of initiators, catalysts, processing aids, resin stabilizers, and pigments, which are also the same as those described above.

Next, the elastomer composition is kneaded using a suitable kneader, such as an open roll or kneader mixer, for example, after kneaded at a temperature of 130 to 160° C., the elastomer composition is discharged from the kneader at a temperature of 140 to 170° C.

Subsequently, the kneaded elastomer composition is extruded and pelletized to obtain the desired elastic infill. A general extruder, for example, a Banbury kneader, a Buss kneader, a single screw extruder or a twin screw extruder may be used to extrude the elastomer composition. The extrusion may be performed, for example, in the temperature range of 90 to 170° C. During the extrusion, the silane coupling agent is chemically bound to the base resin to form a silane grafted copolymer.

When extruded at a high temperature, the elastomer composition is automatically cut to a particle size of 0.5 to 3 mm in a hot cutting or underwater cutting mode by a die mounted on a compression head of the extruder. As a result, the elastomer composition can be produced into chips in the shape of elliptical or circular pellets with an average size of 0.5 to 3 mm.

In one preferred embodiment, the method further includes heating the pelletized elastic infill in water to cross-link the elastic infill. For example, the cross-linking may be performed in water at 70 to 90° C. for 3 to 5 hours.

In one preferred embodiment, the method further includes allowing the pelletized elastic infill to stand under ambient conditions to cross-link the elastic infill. In this embodiment, the pelletized elastic infill may be cross-linked slowly by the reaction of the silane coupling agent with water in air.

Unlike waste tire chips produced by pulverization, the elastic infill of the present invention has a uniform size and a pellet shape after extrusion, which makes it possible that the elastic infill of the present invention produces no dust, has high heat resistance and elasticity, is not harmful to humans, and causes no environmental problems. In addition, the elastic infill of the present invention is economically advantageous because of its low price.

The present disclosure will be explained in more detail with reference to the following examples. However, these examples are not intended to limit the scope of the present disclosure and various modifications can be made thereto without departing from the spirit and scope of the present invention as set forth in the appended claims.

EXAMPLES

Waste tire chips: Threads were peeled from waste tires (1.0-3.0 mm, CTCR 01, Cryotech, Korea) and pulverized at −200° C. to produce chips.

Comparative Examples 1-4

Elastomer compositions were prepared as shown in Table 1. Each of the compositions was kneaded in a kneader under pressure at 120° C., discharged at 150° C., transferred to a hopper of a twin screw extruder, and pelletized to a diameter of 2 mm by a rotary knife rotating at 150 rpm attached to an underwater cutting die of the extruder set at 160° C. to produce an elastic infill for artificial turf. The elastic infill was placed in a 10 mm thick mold, heated at 150° C. for 5 min, cooled to room temperature, and measured for rebound resilience and compression set.

Examples 1-7

Elastomer Compositions were prepared as shown in Table 1. Each of the compositions was kneaded in a kneader under pressure at 120° C., discharged at 150° C., transferred to a hopper of a twin screw extruder, and pelletized to a diameter of 2 mm by a rotary knife rotating at 150 rpm attached to an underwater cutting die of the extruder set at 160° C. to produce an elastic infill for artificial turf. The elastic infill was placed in a 10 mm thick mold, heated at 150° C. for 5 min, cooled to room temperature, cross-linked in water at 60° C. for 24 h, and measured for rebound resilience and compression set.

The following base resins and silane coupling agent were used.

EVA-1: Ethylene vinyl acetate copolymer (VA: 33%, MI: 13, hardness: 63, Hanwha EVA 1833, Hanwha Chemical)

EAO-1: Ethylene alpha olefin copolymer (density: 0.863, MI: 0.5, hardness: 63, Engage 8180, Dow Chemical)

OBC-1: Olefin block copolymer (density: 0.877, MI: 5.0, hardness: 60, Infuse D9507, Dow Chemical)

SEBS-1: Styrene ethylene butylene styrene (density: 0.89, MI: 3.0, hardness: 67, Tuftec H1052, Asahi Kasei)

Silane-1: Vinyltrimethoxysilane

The physical properties of the elastic infills produced in Comparative Examples 1-4 and Examples 1-7 are shown in Table 1.

TABLE 1

| | Waste tire | Comparative Example 1 | Comparative Example 2 | Comparative Example 3 | Example 1 | Example 2 | Example 3 | Example 4 | Example 5 | Example 6 | Example 7 | Comparative Example 4 |
|---|---|---|---|---|---|---|---|---|---|---|---|---|
| EVA-1 | | 100 | | | 100 | | | 50 | 80 | | 100 | 100 |
| EAO-1 | | | 100 | | | 100 | | 50 | | 80 | | |
| OBC-1 | | | | | | | 100 | | | | | |
| SEBS-1 | | | | 100 | | | | | 20 | 20 | | |
| Calcium carbonate (CaCO₃) | | 200 | 200 | 200 | 200 | 200 | 200 | 200 | 200 | 200 | 200 | 200 |
| Polybutene | | 50 | 50 | | 50 | 50 | 50 | 50 | 50 | 50 | 50 | 50 |
| Paraffin oil | | | | 50 | | | | | | | | |
| Benzoyl peroxide (BPO) | | | | | 0.5 | 0.5 | 0.5 | 0.5 | 0.5 | 0.5 | 0.5 | 0.5 |
| Silane-1 | | | | | 2.0 | 2.0 | 2.0 | 2.0 | 2.0 | 2.0 | 1.0 | 0.4 |
| DBTL | | | | | 0.5 | 0.5 | 0.5 | 0.5 | 0.5 | 0.5 | 0.5 | 0.5 |
| Antioxidant | | 1.0 | 1.0 | 1.0 | 1.0 | 1.0 | 1.0 | 1.0 | 1.0 | 1.0 | 1.0 | 1.0 |
| UV absorber | | 1.0 | 1.0 | 1.0 | 1.0 | 1.0 | 1.0 | 1.0 | 1.0 | 1.0 | 1.0 | 1.0 |
| Hardness Shore A | 55 | 55 | 55 | 55 | 56 | 56 | 55 | 55 | 56 | 56 | 55 | 55 |
| Rebound resilience | 55 | 40 | 45 | 55 | 52 | 52 | 53 | 51 | 53 | 54 | 50 | 45 |
| Compression set (r.t., ASTM D395, %) | 10 | 30 | 28 | 11 | 10 | 8 | 5 | 9 | 11 | 10 | 15 | 27 |
| Compression set (70° C., ASTM D395, %) | 20 | 100 | 95 | 25 | 30 | 26 | 20 | 28 | 28 | 25 | 35 | 70 |
| Evaluation of agglomeration when loaded at 70° C. | Good | Very poor | Very poor | Good | Good | Good | Good | Good | Good | Good | Good | Poor |
| Dust | Observed | Not observed | Not observed | Not observed | Not observed | Not observed | Not observed | Not observed | Not observed | Not observed | Not observed | Not observed |
| Overall performance judgement | Poor | Poor | Poor | Good | Good | Good | Good | Good | Good | Good | Good | Poor |
| Suitability as infill | Unsuitable | Unsuitable | Unsuitable | Unsuitable (expensive) | Suitable | Suitable | Suitable | Suitable | Suitable | Suitable | Suitable | Unsuitable |

The rebound resilience of each elastic infill was tested according to ASTM D2632. The elastic infill was judged to be "good" when the rebound resilience was ≥50% and "poor" when <50%.

The compression set of each elastic infill was tested according to ASTM D395. The elastic infill was judged to be "good" when the compression set at room temperature was <25% and "poor" when ≥25%. The elastic infill was judged to be "good" when the compression set at 70° C. was <40% and "poor" when >40%.

The degree of agglomeration of each elastic infill was evaluated when the elastic infill was loaded at a high temperature. To this end, 1,000 g of the sample was put in an envelope made of nylon cloth (20 cm (w)×20 cm (l)) and introduced into an oven at 70° C. A stainless steel plate (1,000 g) having a size of 15 cm (d)×7 mm (t) was placed on the sample. After heating for 24 h, the sample was withdrawn from the oven. Some of the infill particles in the nylon envelope were observed to agglomerate. The agglomerations were collected and weighed. The infill was judged to be "good" when the weight of the-agglomerations was <30 g, "poor" when ≥30 g, and "very poor" when ≥900 g.

Each infill sample was constructed in artificial turf (1 m× 1 m). After a football was dropped from a height of 1 m onto the artificial turf, the occurrence of dust from the artificial turf was observed with naked eyes.

As can be seen from the results in Table 1, the elastic infills produced by cross-linking of the ethylene copolymers in Examples 1-7 were found to have at least 60% lower high-temperature compression sets than those produced in Comparative Examples 1 and 2, demonstrating their higher elastic recovery. The elastic infills of Examples 1-7 are inexpensive compared to the elastic infill produced using SEBS in Comparative Example 3. In addition, the elastic infill of Examples 1-7 underwent less agglomeration even when loaded at 70° C., revealing their better heat resistance. Therefore, the elastic infills of Examples 1-7 are suitable for use in artificial turf.

The waste tire chips produced a large amount of dust to cause pollution when struck with a football. When the waste tire chips were continuously exposed to sunlight under an ambient atmosphere at 30° C., their surface temperature increased to 70° C. Such problems were not encountered in the inventive elastic infills. In conclusion, the inventive elastic infills can provide a comfortable exercise environment for players.

The invention claimed is:

1. An elastic infill for artificial turf that is produced by pelletization of an elastomer composition comprising:
    a silane coupling agent and
    a mixture of an olefin copolymer-containing base resin and an inorganic filler,
    wherein the silane coupling agent is present in admixture with the mixture or is grafted onto the olefin copolymer to allow cross-linking of the olefin copolymer in the presence of water.

2. The elastic infill for artificial turf according to claim 1, wherein the olefin copolymer is a copolymer of i) ethylene and ii) at least one ethylenically unsaturated monomer selected from the group consisting of $C_3$-$C_{10}$ α-monoolefins, $C_1$-$C_{12}$ alkyl esters of $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinyl esters of saturated $C_2$-$C_{18}$ carboxylic acids.

3. The elastic infill for artificial turf according to claim 1, wherein the olefin copolymer is an olefin/α-olefin (OAO) copolymer.

4. The elastic infill for artificial turf according to claim 3, wherein the olefin is ethylene or propylene and the α-olefin is an olefin consisting of three or more carbon atoms and having a terminal carbon-carbon double bond.

5. The elastic infill for artificial turf according to claim 3, wherein the olefin/α-olefin copolymer is an olefin random copolymer.

6. The elastic infill for artificial turf according to claim 5, wherein the olefin random copolymer is a random copolymer of ethylene or propylene and at least one copolymeric α-olefin comonomer.

7. The elastic infill for artificial turf according to claim 3, wherein the olefin/α-olefin copolymer is an olefin block copolymer.

8. The elastic infill for artificial turf according to claim 7, wherein the olefin block copolymer is a multi-block copolymer which comprises ethylene and one or more copolymerizable α-olefin comonomers in a polymerized form and has a plurality of blocks or segments of two or more polymerized monomer units having different chemical or physical properties.

9. The elastic infill for artificial turf according to claim 1, wherein the base resin further comprises a rubber selected from the group consisting of natural rubbers, synthetic rubbers, and combinations thereof.

10. The elastic infill for artificial turf according to claim 9, wherein the rubber is present in an amount of 5 to 50 parts by weight, based on 100 parts by weight of the olefin copolymer.

11. The elastic infill for artificial turf according to claim 1, wherein the silane coupling agent is an alkoxysilane compound.

12. The elastic infill for artificial turf according to claim 1, wherein the silane coupling agent is present in an amount of 0.5 to 20 parts by weight, based on 100 parts by weight of the base resin.

13. The elastic infill for artificial turf according to claim 1, wherein the elastic infill has a compression set of 2 to 20% at room temperature and 15 to 40% at 70° C., as measured based on ASTM D395.

* * * * *